United States Patent
Lee

(10) Patent No.: US 6,356,583 B1
(45) Date of Patent: Mar. 12, 2002

(54) DEVICE AND METHOD FOR CONTROLLING THE BAUD RATE BETWEEN A PORTABLE TELEPHONE AND AN EXTERNAL DEVICE

(75) Inventor: Sang-Ha Lee, Taegukwangyok-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/116,727

(22) Filed: Jul. 16, 1998

(30) Foreign Application Priority Data

Jul. 16, 1997 (KR) .......................................... 97-33180

(51) Int. Cl.$^7$ ............................. H04B 1/38; H04L 29/08
(52) U.S. Cl. ...................... 375/220; 375/222; 370/522
(58) Field of Search .......................... 379/90; 375/220, 375/322, 214; 370/522, 252; 710/20; 709/100

(56) References Cited

U.S. PATENT DOCUMENTS

| | | | |
|---|---|---|---|
| 5,524,122 A | | 6/1996 | Lepitre et al. |
| 5,941,965 A | * | 8/1999 | Moroz et al. ................ 710/101 |
| 5,963,622 A | * | 10/1999 | Walsh ...................... 379/93.33 |
| 5,978,591 A | * | 11/1999 | Barthomolow et al. ...... 395/712 |
| 6,031,848 A | * | 2/2000 | Brennan ...................... 370/522 |
| 6,175,576 B1 | * | 1/2001 | Boakye et al. .............. 370/524 |
| 6,189,056 B1 | * | 2/2001 | Ogura et al. ................... 710/62 |

FOREIGN PATENT DOCUMENTS

| | | |
|---|---|---|
| EP | 0207595 | 1/1987 |
| EP | 0343305 | 11/1989 |
| EP | 0463269 | 1/1992 |
| EP | 0281307 | 9/1998 |
| GB | 2303769 | 2/1997 |
| WO | 9522217 | 8/1995 |

* cited by examiner

Primary Examiner—Chi Pham
Assistant Examiner—Dung X Nguyen
(74) Attorney, Agent, or Firm—Dilworth & Barrese, LLP

(57) ABSTRACT

A device and method for controlling the baud rate between a portable telephone and an external device is provided. A first input/output (I/O) port is connected to the portable telephone which transmits and receives data to/from the portable telephone, and a second I/O port is connected to the external device which transmits and receives data to/from the external device. A controller interposed between the first and second I/O ports, detects a first baud rate of the portable telephone, converts an initial baud rate of the first I/O port to the first baud rate, and transmits the data to the portable telephone via the first I/O port. The controller also detects a second baud rate of the external device, converts an initial baud rate of the second I/O port to the second baud rate, and transmits the data to the external device via the second I/O port.

8 Claims, 2 Drawing Sheets

DEVICE AND METHOD FOR CONTROLLING THE BAUD RATE BETWEEN A PORTABLE TELEPHONE AND AN EXTERNAL DEVICE

BACKGROUND OF THE INVENTION

1. Field of the Invention

The present invention relates to portable telephones. More particularly, it relates to controlling the baud rate between a portable telephone and an external device.

2. Description of the Related Art

In general, a portable telephone exchanges an initial signal and an acknowledge signal with an external device like a hands-free kit or a charger, and executes a corresponding operation upon sensing the acknowledge signal output from the external device.

In a conventional portable telephone, when the baud rate of the portable telephone is different from that of external devices, data transmission therebetween is impossible. That is, the portable telephone is not compatible with different kinds of external devices. Thus, when developing a new portable telephone that has a baud rate which is different from that of existing portable telephones, new external devices having a baud rate which matches that of newly developed portable telephone must also be developed. Furthermore, when performing a simple test by connecting a conventional portable telephone to a computer, since the baud rate of the computer is different from that of the portable telephone, it is necessary to create a new program so as to match the baud rate of the computer to that of the portable telephone.

SUMMARY OF THE INVENTION

Accordingly, an object of the present invention is to provide a device and method for controlling the baud rate between a portable telephone and an external device.

To achieve the above object, there is provided a device for controlling the baud rate between a portable telephone and an external device. The device, according to an embodiment of the invention, includes a first input/output (I/O) port adapted to be connected to the portable telephone which transmits and receives data to and from the portable telephone, and a second I/O port adapted to be connected to the external device which transmits and receives data to and from the external device. A controller connected to the first and second I/O ports, detects a first baud rate of the portable telephone, converts an initial baud rate of the first I/O port to the first baud rate, and transmits the data to the portable telephone via the first I/O port. In addition, the controller detects a second baud rate of the external device, converts an initial baud rate of the second I/O port, and transmits the data to the external device via the second I/O port.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF PREFERRED EMBODIMENTS

Figure 1:
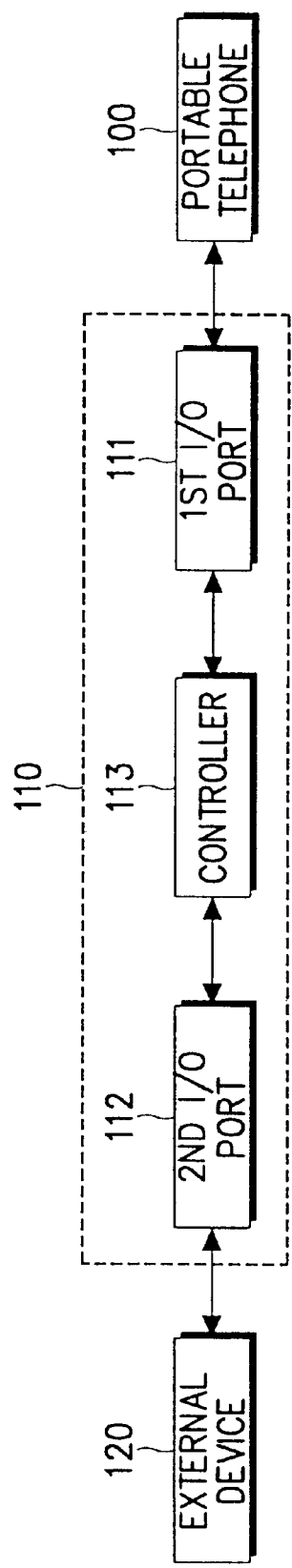
FIG. 1 is a block diagram of a device for controlling the baud rate between a portable telephone and an external device according to an embodiment of the present invention.

FIG. 1 is a block diagram showing a device for controlling a baud rate between a portable telephone 100 and an external device 120 according to an embodiment of the present invention. As illustrated, the device 110 includes a first input/output (I/O) port 111 through which data is transmitted and received to/from the portable telephone 100, a second I/O port 112 through which data is transmitted and received to/from the external device 120, and a controller 113 for controlling the baud rates of the first and second I/O ports 111 and 112, respectively.

The controller 113 stores a program in an internal memory for controlling the baud rate between the portable telephone 100 and the external device 120, and stores controllable baud rates as shown in Table 1 for instance, to convert the baud rates of the first and second I/O ports 111 and 112, respectively.

TABLE 1

| Register Value | Baud Rate (bps) |
| --- | --- |
| 0 × 00 | 1,200 |
| 0 × 01 | 2,400 |
| 0 × 02 | 9,600 |
| 0 × 03 | 14,400 |
| 0 × 04 | 28,800 |
| 0 × 05 | 56,000 |
| 0 × 06 | 152,000 |

Figure 2:
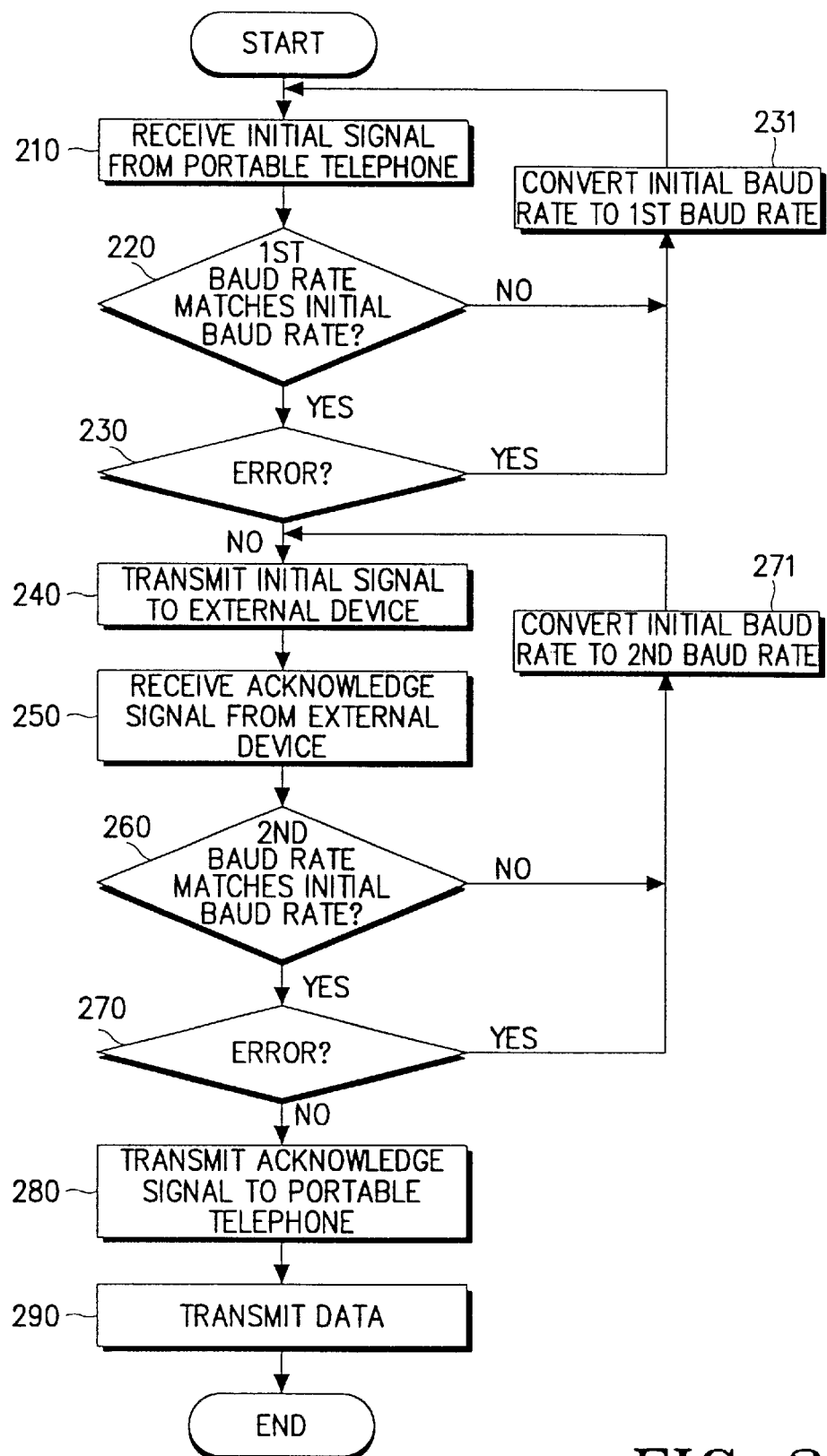
FIG. 2 is a flow chart for controlling the baud rate between the portable telephone and the external device according to an embodiment of the present invention.

The controller 113 controls the baud rates of the first and second I/O ports 111 and 112, respectively, to match the baud rate between the portable telephone 100 and the external device 120 according to the control process as shown in FIG. 2. The first I/O port 111 transmits the data received from the portable telephone 100 to the controller 113 and transmits the data received from the controller 113 to the portable telephone 100. The first I/O port 111 receives the baud rate of the portable telephone 100, (i.e., a first baud rate) and applies it to the controller 113. Controller 113 then detects the first baud rate and compares it with an initial baud rate of the first I/O port 111. If the first baud rate does not match the initial baud rate, the controller 113 controls the first I/O port 111 to convert the initial baud rate to the first baud rate. That is, the first I/O port 111 converts the baud rate of the data received from the external device 120 to the baud rate of the portable telephone 100 and then transmits the received data to the portable telephone 100, under the control of the controller 113.

Similarly, the second I/O port 112 transmits the data received from the external device 120 to the controller 113 and transmits the data received from the controller 113 to the external device 120. The second I/O port 112 receives the baud rate of the external device 120, (i.e., a second baud rate) and applies it to the controller 113. Controller 113 then detects the second baud rate and compares it with an initial baud rate of the second I/O port 112. If the second baud rate does not match the initial baud rate of the second I/O port 112, the controller 113 controls the second I/O port 112 to convert the initial baud rate to the second baud rate. That is, the second I/O port 112 converts the baud rate of the data received from the portable telephone 100 to the baud rate of the external device 120 and then transmits the received data to the external device 120, under the control of the controller 113.

FIG. 2 is a flow chart for controlling the baud rate between the portable telephone 100 and the external device 120 according to an embodiment of the present invention.

Referring to FIGS. 1 and 2, the baud rate control between the portable telephone 100 and the external device 120 is described. The controller 113 receives an initial signal from the portable telephone 100 via the first I/O port 111 and detects the baud rate of the portable telephone 100, i.e., a first baud rate (step 210). Controller 113 compares the first baud rate with an initial baud rate of the first I/O port 111 stored at an internal memory to determine whether the first baud rate matches the initial baud rate (step 220). If the first baud rate matches the initial baud rate, the controller 113 checks, in step 230, if any transmission error has occurred while the data is received from the portable telephone 100 via the first I/O port 111. When the first baud rate does not match the initial baud rate (step 220) or the transmission error has occurred (step 230), the controller 113 controls the first I/O port 111 to convert the initial baud rate to the first baud rate in step 231, and then returns to step 210.

On the other hand, if no transmission error has occurred (at step 230) while the data is received from the portable telephone 100, the controller 113 transmits an initial signal to the external device 120 via the second I/O port 112 (step 240). The controller 113 then receives an acknowledge signal from the external device 120 via the second I/O port 112 (step 250) to detect the baud rate of the external device 120 (i.e., a second baud rate). At step 260, the controller 113 compares the second baud rate with an initial baud rate of the second I/O port 112 stored in the internal memory to determine whether the second baud rate matches the initial baud rate of the second I/O port 112. If the second baud rate matches the initial baud rate, the controller checks if any transmission error has occurred while the data is received from the external device 120 via the second VO port 112 (step 270). When the second baud rate does not match the initial baud rate of the second I/O port 112 (step 260), or a transmission error has occurred while the data is received from the external device 120 (step 270), the controller 113 controls the second I/O port 112 to convert the initial baud rate to the second baud rate in step 271, and then returns to step 240.

If the data is normally received from the external device 120, the controller 113 transmits an acknowledge signal to the portable telephone 100 via the first I/O port 111 (step 280). In step 290, the controller 113 transmits the data received from the external device 120 to the portable telephone 100, and the data received from the portable telephone 100 to the external device 120 via the first and second I/O ports 111 and 112, respectively.

An exemplary operation of the device for controlling the baud rate between the portable telephone 100 and the external device 120 will be described. In this example, it is assumed that the baud rate of the portable telephone 100 is 9,600 bps, the baud rate of the external device 120 is 14,400 bps and the initial baud rates of the first and second I/O ports 111 and 112, respectively, are both 1,200 bps. The controller 113 gradually converts the initial baud rate of the first I/O port 111, while checking the data transmission error, to adjust the initial baud rate to the baud rate of the portable telephone 100. That is, the controller 113 gradually converts the 1,200 bps initial baud rate of the first I/O port 111 to the 9,600 bps baud rate of the portable telephone 100 and then transmits data to the portable telephone 100. Similarly, the controller 113 gradually converts the initial baud rate of the second I/O port 112, while checking the data transmission error, to adjust the initial baud rate to the baud rate of the external device 120. That is, the controller 113 gradually converts the 1,200 bps initial baud rate of the second I/O port 112 to the 14,400 bps baud rate of the external device 120 and then transmits data to the external device 120.

As described above, the present invention enables data communication between an external device and a portable telephone of a different model having a baud rate which is different from that of the external device. By controlling the baud rate between the external device and the portable telephone, the compatibility between a portable telephone and external devices is enhanced.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A device for controlling a baud rate between a portable telephone and an external device, comprising:
    a first input/output (I/O) port adapted to be connected to the portable telephone for transmitting and receiving data to and from the portable telephone, said first I/O port having a baud rate;
    a second I/O port adapted to be connected to the external device for transmitting and receiving data to and from said external device, said second I/O port having a baud rate; and
    a controller connected to the first and second I/O ports for converting an initial baud rate of the first I/O port to a first baud rate of the portable telephone, and converting an initial baud rate of the second I/O port to a second baud rate of the external device.

2. The device as claimed in claim 1, wherein said controller detects the first baud rate of the portable telephone via the first I/O port and compares the detected first baud rate with the initial baud rate of the first I/O port to determine whether conversion of the initial baud rate of the first I/O port is required, said controller transmitting data to and from the portable telephone via said first I/O port when said first baud rate and the baud rate of the first I/O port are equal.

3. The device as claimed in claim 1, wherein said controller detects the second baud rate of the external device via the second I/O port and compares the detected second baud rate with the initial baud rate of the second I/O port to determine whether conversion of the initial baud rate of the second I/O port is required, said controller transmitting data to and from the external device via said second I/O port when said second baud rate and the baud rate of the second I/O port are equal.

4. A method for controlling the baud rate between a portable telephone and an external device comprising the steps of:
    comparing a first baud rate of the portable telephone with an initial baud rate of a first I/O port to which the portable telephone is connected;
    comparing a second baud rate of the external device with an initial baud rate of a second I/O port to which the external device is connected;
    converting the initial baud rate of the first I/O port to equal the first baud rate of the portable telephone when the initial baud rate does not equal the first baud rate; and
    converting the initial baud rate of the second I/O port to equal the second baud rate of the external device when the initial baud rate of the second I/O port does not equal the second baud rate.

5. The method as claimed in claim 4, wherein said step of comparing a first baud rate further comprises the steps of:
    receiving an initial signal from the portable telephone when connected to the first I/O port;

detecting the first baud rate of the portable telephone; and transmitting an initial signal to the external device.

6. The method as claimed in claim 4, wherein said step of comparing a second baud rate further comprises the steps of:

transmitting an initial signal to the external device;

receiving an acknowledge signal from the external device; and detecting the second baud rate of the external device in response to the received acknowledge signal.

7. The method as claimed in claim 4, further comprising the step of transmitting data received from the portable telephone to the external device and data received from the external device to the portable telephone via said first and second I/O ports when the first and second baud rates equal the initial baud rates of the first and second I/O ports, respectively.

8. A method for controlling a baud rate between a portable telephone and an external device for use in a device having a first I/O port for transmitting and receiving data to/from the portable telephone, a second I/O port for transmitting and receiving data to/from the external device, and a controller for controlling baud rates of the first and second I/O ports, said method comprising the steps of:

detecting a first baud rate of the portable telephone, comparing the first baud rate with an initial baud rate of the first I/O port, and converting the initial baud rate of the first I/O port to the first baud rate when the first baud rate is not equal to the initial baud rate of the first I/O port;

detecting a second baud rate of the external device, comparing the second baud rate with an initial baud rate of the second I/O port, and converting the initial baud rate of the second I/O port to the second baud rate when the second baud rate is not equal to the initial baud rate of the second I/O port; and transmitting the data received from the portable telephone to the external device and the data received from the external device to the portable telephone via the first and second I/O ports, when the first and second baud rates match the initial baud rates of the first and second I/O ports, respectively.

* * * * *